United States Patent
Lee

(10) Patent No.: US 9,537,177 B2
(45) Date of Patent: Jan. 3, 2017

(54) ELECTRODE ASSEMBLY AND SECONDARY BATTERY INCLUDING THE SAME

(75) Inventor: Young-Woo Lee, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 860 days.

(21) Appl. No.: 12/914,018

(22) Filed: Oct. 28, 2010

(65) Prior Publication Data
US 2011/0129718 A1 Jun. 2, 2011

(30) Foreign Application Priority Data
Dec. 1, 2009 (KR) .......... 10-2009-0117882

(51) Int. Cl.
H01M 2/26 (2006.01)
H01M 10/0585 (2010.01)
H01M 2/20 (2006.01)
H01M 10/02 (2006.01)
H01M 10/052 (2010.01)

(52) U.S. Cl.
CPC ......... *H01M 10/0585* (2013.01); *H01M 2/202* (2013.01); *H01M 2/206* (2013.01); *H01M 2/26* (2013.01); *H01M 10/02* (2013.01); *H01M 10/052* (2013.01); *Y02E 60/122* (2013.01)

(58) Field of Classification Search
CPC ......... H01M 2/202; H01M 2/206; H01M 2/26
USPC .......................................... 429/161
See application file for complete search history.

(56) References Cited

U.S. PATENT DOCUMENTS

| 2001/0038945 A1* | 11/2001 | Kitoh et al. ................. 429/211 |
| 2002/0010998 A1* | 1/2002 | Komatsu ..................... 29/623.2 |
| 2002/0015892 A1 | 2/2002 | Kitoh |
| 2005/0263572 A1* | 12/2005 | Nakamura ..................... 228/901 |
| 2007/0269685 A1* | 11/2007 | Chu et al. ........................ 429/3 |
| 2008/0305394 A1* | 12/2008 | Hisamitsu et al. .......... 429/209 |
| 2009/0317717 A1 | 12/2009 | Ryu et al. |
| 2010/0028770 A1 | 2/2010 | Ryu et al. |

FOREIGN PATENT DOCUMENTS

| JP | 2004273320 | 9/2004 |
| JP | 2005-063971 | 3/2005 |
| JP | 2009087612 | 4/2009 |

(Continued)

OTHER PUBLICATIONS

English Translation of JP 2009-087612.*
(Continued)

*Primary Examiner* — Ula C Ruddock
*Assistant Examiner* — Frank Chernow
(74) *Attorney, Agent, or Firm* — Robert E. Bushnell, Esq.

(57) ABSTRACT

An electrode assembly and a secondary battery including the same. The electrode assembly includes a plurality of alternately disposed positive electrode plates and negative electrode plates, separators disposed between the positive electrode plates and the negative electrode plates, a plurality of positive electrode tabs formed in the plurality of positive electrode plates, a plurality of negative electrode tabs formed in the plurality of negative electrode plates, a positive electrode lead including a clip accommodating the plurality of positive electrode tabs and a lead line coupled to the clip, and a negative electrode lead including a clip accommodating the plurality of negative electrode tabs and a lead line coupled to the clip.

17 Claims, 5 Drawing Sheets

(56) References Cited

FOREIGN PATENT DOCUMENTS

KR    1019990023505 A    3/1999
KR    1020080070206 A    7/2008

OTHER PUBLICATIONS

Korean Office action issued by KIPO on Dec. 19, 2011, corresponding to KR 10-2009-0117882 and Request for Entry attached herewith.
Korean Office Action issued by KIPO, dated Apr. 13, 2011, corresponding to Korean Patent Application No. 10-2009-0117882, together with Request for Entry.

* cited by examiner

ELECTRODE ASSEMBLY AND SECONDARY BATTERY INCLUDING THE SAME

CLAIM OF PRIORITY

This application makes reference to, incorporates into this specification the entire contents of, and claims all benefits accruing under 35 U.S.C. §119 from an application earlier filed in the Korean Intellectual Property Office on Dec. 1, 2009, and there duly assigned Serial No. 10-2009-0117882.

BACKGROUND OF THE INVENTION

Field of the Invention

An embodiment of the present invention relates to an electrode assembly and a secondary battery including the same, and more particularly, to an electrode assembly generating a large capacity of current and a secondary battery including the same.

Description of the Related Art

As the use of portable electronic apparatus increases, the use of a rechargeable secondary battery is increasing. In accordance with the request of a user, researches on making a secondary battery small and light are being performed.

Since a lithium (Li) battery as a representative secondary battery has higher operation voltage and energy density per unit weight than a nickel-cadmium (Ni—Cd) battery or a nickel-hydrogen (NI-MH) battery, the use of the Li battery is increasing.

The lithium battery is divided into a lithium-ion battery for which liquid electrolyte is used and a lithium-polymer battery for which high molecular electrolyte is used. The lithium battery may have various shapes such as a cylinder type, a prismatic type, and a pouched type in accordance with the shape of a case.

SUMMARY OF THE INVENTION

Accordingly, the present invention has been made to provide an improved electrode assembly and an improved secondary battery.

In addition, the present invention has been made to provide an improved electrode assembly in which a large capacity of electrons easily move and a secondary battery including the same.

In order to achieve the foregoing and/or other aspects of the present invention, according to an aspect of the present invention, there is provided an electrode assembly, including a plurality of alternately disposed positive electrode plates and negative electrode plates, separators provided between the positive electrode plates and the negative electrode plates, a plurality of positive electrode tabs formed in the plurality of positive electrode plates, a plurality of negative electrode tabs formed in the plurality of negative electrode plates, a positive electrode lead including a clip accommodating the plurality of positive electrode tabs and a lead line coupled to the clip, and a negative electrode lead including a clip accommodating the plurality of negative electrode tabs and a lead line coupled to the clip.

According to another aspect of the present invention, there is provided a secondary battery, including the electrode assembly and a case including a main body accommodating the electrode assembly and a cover that contacts the main body in order to seal up the electrode assembly in the state where parts of the lead lines are exposed to the outside.

In the electrode assembly according to the present invention, the plurality of electrode tabs are accommodated in the clips of the electrode leads. A plurality of pins formed in the clips are inserted into holes formed in the plurality of electrode tabs. Alternatively, a plurality of protrusions formed in the clips compress the plurality of electrode tabs. As a result, the electrode tabs may be stably coupled to the electrode leads, a contact area between the plurality of electrode tabs and the electrode leads may increase, and a large capacity of current may easily move. Therefore, a high output secondary battery stably outputting the large capacity of current may be realized.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
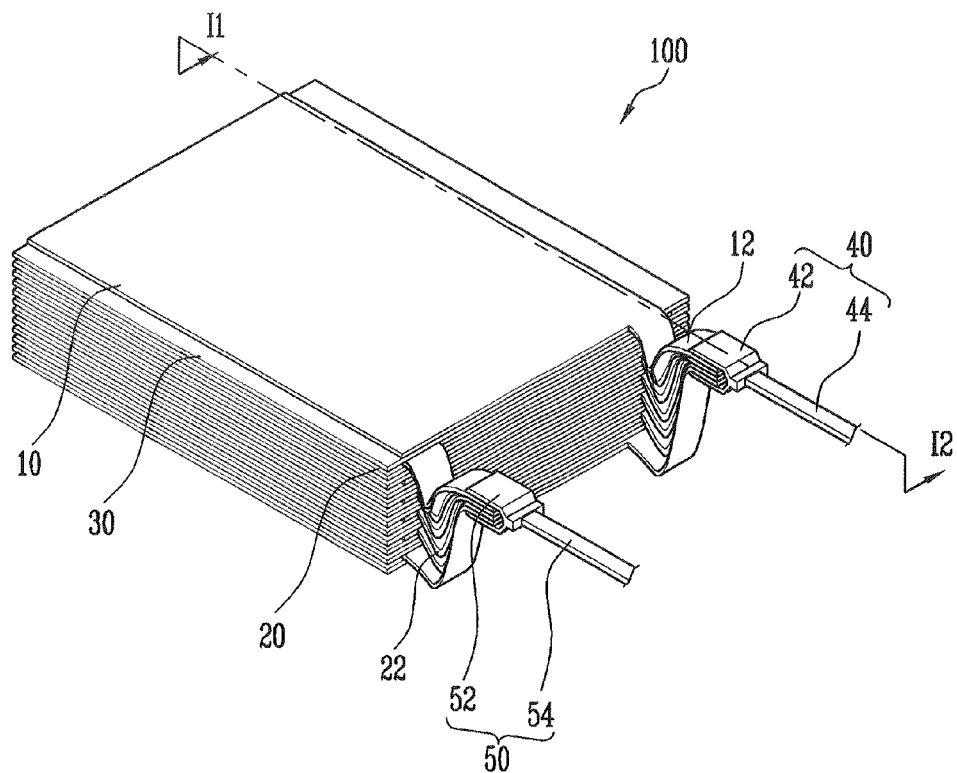
FIG. 1 is an oblique view illustrating an electrode assembly constructed as an embodiment according to the principles of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on another element or be indirectly on another element with one or more intervening elements interposed therebetween. Also, when an element is referred to as being "connected to" another element, it can be directly connected to another element or be indirectly connected to another element with one or more intervening elements interposed therebetween. Hereinafter, like reference numerals refer to like elements.

Hereinafter, exemplary embodiments of the present invention will be described in detail with reference to the accompanying drawings. The following embodiments are provided so that those skilled in the art may fully understand the present invention and may have various modifications. The scope of the present invention is not limited to the embodiments described hereinafter.

The secondary battery includes an electrode assembly generating current and a case sealing up and protecting the electrode assembly. The electrode assembly includes positive electrode plates and negative electrode plates including electrode tabs, separators interposed between the positive electrode plates and the negative electrode plates, and electrode leads coupling the electrode tabs to an external circuit.

In general, the current generated by the electrode assembly is output to an external circuit through the electrode tabs and the electrode leads. When the amount of the output current increases as the capacity of the secondary battery increases, however, the current channel provided by the electrode tabs and the electrode leads is insufficient, and it is difficult to stably couple the plurality of electrode tabs to electrode leads so that a large capacity of electrons do not easily move.

Figure 2:
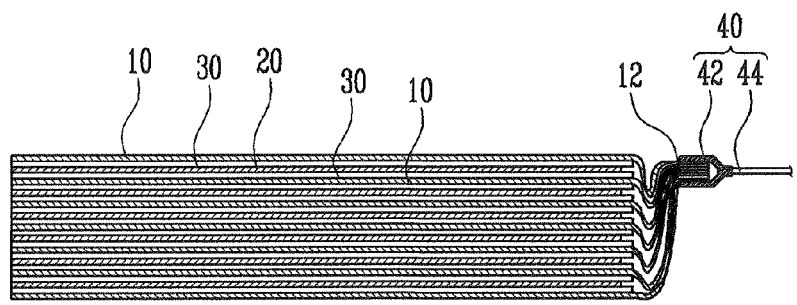
FIG. 2 is a cross-sectional view of the electrode assembly taken along sectional line I1-I2 of FIG. 1.

FIG. 1 is an oblique view illustrating an electrode assembly constructed as an embodiment according to the principles of the present invention. FIG. 2 is a cross-sectional view of the electrode assembly taken along line I1-I2 of FIG. 1.

Referring to FIGS. 1 and 2, an electrode assembly 100 according to the present invention includes positive electrode plates 10 where positive electrode tabs 12 are formed, negative electrode plates 20 where negative electrode tabs 22 are formed, separators 30 provided between positive electrode plates 10 and negative electrode plates 20, a positive electrode lead 40 coupled to positive electrode tabs 12, and a negative electrode lead 50 coupled to negative electrode tabs 22.

The plurality of positive electrode plates 10 and negative electrode plates 20 are alternately disposed and separators 30 are provided between positive electrode plates 10 and negative electrode plates 20. That is, positive electrode plates 10, separators 30, and negative electrode plates 20 are sequentially laminated.

Positive electrode plates 10 are made of an aluminum (Al) thin film. Negative electrode plates 20 may be made of a copper (Cu) thin film. Positive electrode plates 10 and negative electrode plates 20 are coated with an active material. For example, positive electrode plates 10 are coated with a positive electrode active material obtained by mixing a lithium based oxide, a binder, and a conductive material with each other; and negative electrode plates 20 are coated with the a negative electrode active material obtained by mixing a material containing carbon, a binder, and a conductive material with each other.

Separators 30 are made of an insulating layer having high ion transmittance and mechanical strength, for example, sheet or non-woven fabric made of olefin based polymer such as chemistry resistant and hydrophobic polypropylene, glass fiber, or polyethylene. Separators 30 may be formed to be larger than positive electrode plate 10 and negative electrode plate 20 for electric insulation.

Positive electrode tab 12 and negative electrode tab 22 are extended from one surface of respectively corresponding one of positive electrode plate 10 and negative electrode plate 20 and are formed on the other side not to contact each other. Positive electrode tab 12 may be made of aluminum (Al), and negative electrode tab 22 may be made of nickel (Ni).

Positive electrode lead 40 and negative electrode lead 50 include clips 42 and 52 respectively accommodating the plurality of positive electrode tabs 12 and negative electrode tabs 22 that are respectively aligned in a line, and lead lines 44 and 54 respectively coupled to clips 42 and 52. After the plurality of positive electrode tabs 12 and negative electrode tabs 22 are respectively aligned in a line, the plurality of positive electrode tabs 12 and the negative electrode tabs may be bent to be easily coupled to clips 42 and 52, respectively. For example, positive electrode tabs 12 and negative electrode tabs 22 that are aligned in a line are respectively inserted into clips 42 and 52, and then are compressed so that positive electrode tabs 12 are coupled to positive electrode lead 40 and that negative electrode tabs 22 are coupled to negative electrode lead 50.

Figure 3:
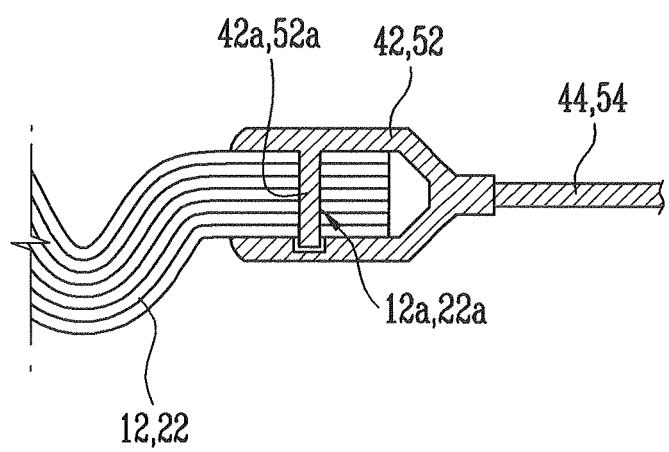
FIG. 3 is a cross-sectional view of an electrode assembly constructed as a first embodiment according to the principles of the present invention.

FIG. 3 is a cross-sectional view illustrating an electrode assembly constructed as the first embodiment according to the principles of the present invention. Holes 12a and 22a are formed in positive tabs 12 and negative electrode tabs 22 that are respectively aligned in a line. Pins 42a and 52a are respectively formed on one side of clips 42 and 52, to be inserted into holes 12a and 22a, respectively, and to be inserted into an opposite side of clips 42 and 52, respectively. Grooves 43 and 53 accommodating pins 42a and 52a may be formed on the opposite sides of clips 42 and 52 corresponding to pins 42a and 52a, respectively. When the vertical ends of pins 42a and 52a respectively contact the bottom surfaces of grooves 24b and 52b, positive electrode tabs 12 and negative electrode tabs 12 may move or conflict. Therefore, the bottom surfaces of pins 42a and 52a may be respectively separated from the bottom surfaces of grooves 24b and 52b by a uniform distance.

Figure 4:
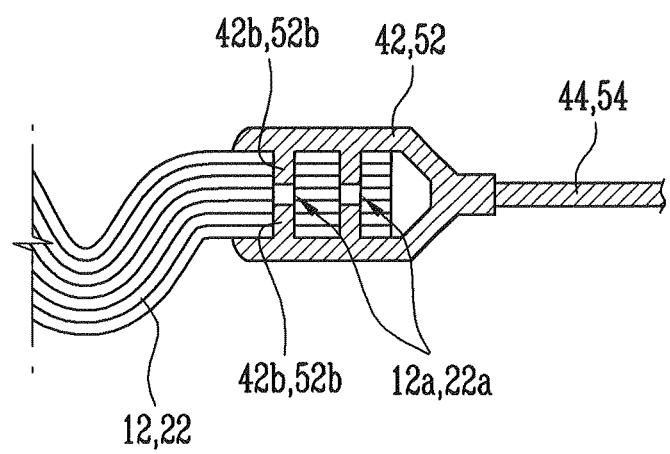
FIG. 4 is a cross-sectional view of an electrode assembly constructed as a second embodiment according to the principles of the present invention.

FIG. 4 is a cross-sectional view of an electrode assembly constructed as the second embodiment according to the principles of the present invention. At least one holes 12a and 22a are respectively formed in positive electrode tabs 12 and negative electrode tabs 22 that are respectively aligned in a line. Pins 42b and 52b are respectively formed on both sides of clips 42 and 52 that respectively contact positive electrode tabs 12 and negative electrode tabs 22. Pins 42b and 52b are inserted into holes 12a and 22a, respectively. When both ends of upper and lower pins 42b and 52b contact, friction may be generated. Therefore, upper pins 42b and 52b may be separated from lower pins 42b and 52b by a predetermined distance. That is, the pins 42b and 52b that are respectively formed on one side of clips 42 and 52, may be separated from the pins 42b and 52b that are respectively formed on an opposite side of clips 42 and 52.

In the electrode assembly constructed as the first and second embodiments according to the principles of the present invention, positive electrode tabs 12 and negative electrode tabs 22 may be made of Fe and the surfaces of positive electrode tabs 12 and negative electrode tabs 22 may be plated with Ni. In addition, holes 12a and 22a may be cylindrical. However, front and rear side margins of the holes may expand, and left and right side margins of the holes may be minimized, so that the holes may be formed to have an elliptical shape.

Figure 5:
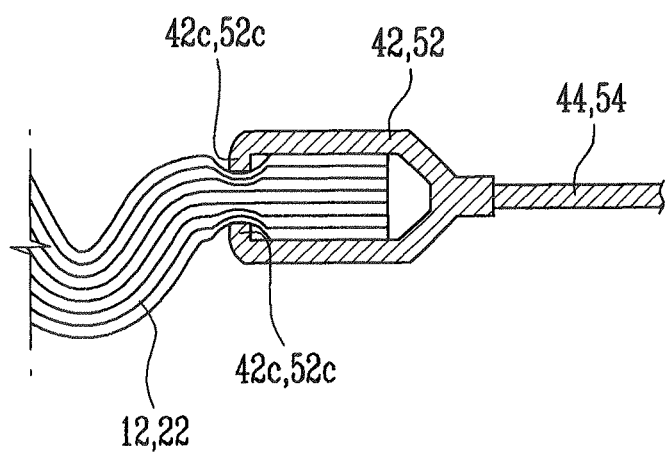
FIG. 5 is a cross-sectional view of an electrode assembly constructed as a third embodiment according to the principles of the present invention.

FIG. 5 is a cross-sectional view of an electrode assembly constructed as the third embodiment according to the principles of the present invention. Protrusions 42c and 52c are respectively formed on both sides of clips 42 and 52 that contact positive electrode tabs 12 and negative electrode tabs 22.

Since the degree of the compression between positive electrode tabs 12 and the compression between negative electrode tabs 22 increases due to protrusions 42c and 52c respectively formed on both sides of clips 42 and 52, positive electrode tabs 12 may be stably coupled to positive electrode lead 40 and negative electrode tabs 22 may be stably coupled to negative electrode lead 50.

Figure 6A:
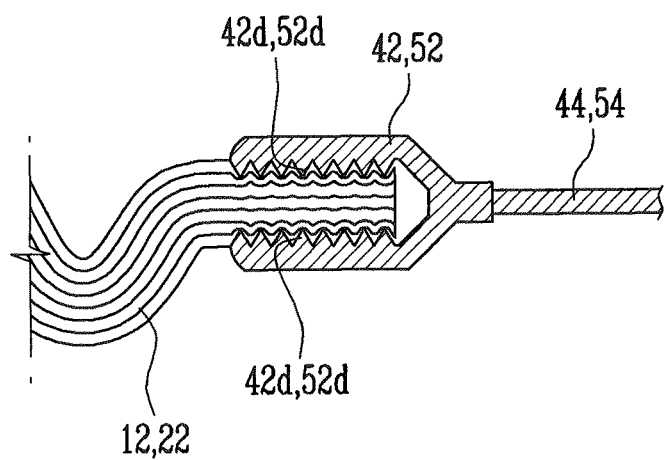
FIG. 6A is a cross-sectional view of an electrode assembly constructed as a fourth embodiment according to the principles of the present invention.

FIG. 6A is a cross-sectional view of an electrode assembly constructed as the fourth embodiment according to the principles of the present invention. A plurality of triangular (saw tooth-shaped) symmetrically oriented protrusions 42d and 52d are formed on both sides of clips 42 and 52 that provide laterally opposite serrated arrays which contact positive electrode tabs 12 and negative electrode tabs 22, respectively. In order to be effectively compressed, positive electrode tabs 12 and negative electrode tabs 22 are made of a flexible metal such as Al, and a plurality of protrusions 42d and 52d are provided on both sides of clips 42 and 52. The plurality of protrusions 42d and 52d provided on a first side of clips 42 and 52 are formed to cross the plurality of protrusions 42d and 52d provided on a second and opposite side of clips 42 and 52. Since positive electrode tabs 12 and negative electrode tabs 22 are compressed by the plurality of protrusions 42d and 52d, respectively, positive electrode tabs 12 may be stably coupled to positive electrode lead 40 and negative electrode tabs 22 may be stably coupled to negative electrode lead 50.

Figure 6B:
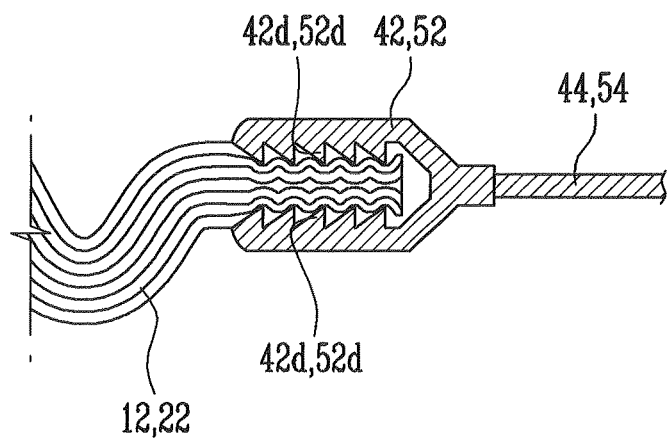
FIG. 6B is a cross-sectional view of an electrode assembly constructed as a fifth embodiment according to the principles of the present invention.

FIG. 6B is a cross-sectional view of an electrode assembly constructed as the fifth embodiment according to the principles of the present invention. In FIG. 6B, asymmetrically oriented triangular protrusions 42d and 52d are unidirectionally inclined and formed in the direction where positive electrode tabs 12 and negative electrode tabs 22 are inserted, so that it is possible to effectively prevent positive electrode tabs 12 and negative electrode tabs 22 from being pulled out. That is, the tips of triangular protrusions 42d and 52d are inclined toward the ends of clips 42 and 52 to which positive electrode tabs 12 and negative electrode tabs 22 are inserted.

Pins 42a, 52a, 42b, and 52b formed in clips 42 and 52 are respectively inserted into holes 12a and 22a formed in the plurality of electrode tabs 12 and 22, or protrusions 42c, 52c, 42d, and 52d formed in clips 42 and 52 respectively compress the plurality of electrode tabs 12 and 22. As a result, electrode tabs 12 and 22 are stably coupled to electrode leads 40 and 50, and thus the contact area between the plurality of electrode tabs 12 and 22 and electrode leads 40 and 50 increases. Therefore, the large capacity of current easily moves.

Figure 7:
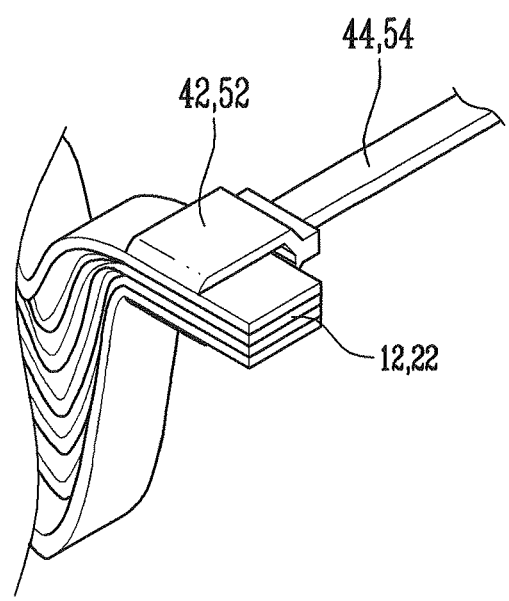
FIG. 7 is an oblique view of an electrode assembly constructed as a sixth embodiment according to the principles of the present invention.

FIG. 7 is an oblique view illustrating an electrode assembly constructed as the sixth embodiment according to the principles of the present invention. The plurality of positive electrode tabs 12 are welded to each other, and the plurality of negative electrode tabs 22 are welded to each other. Clips 42 and 52 are provided to cross the plurality of positive electrode tabs 12 and negative electrode tabs 22.

Clips 42 and 52 are provided to cross the plurality of positive electrode tabs 12 and negative electrode tabs 22 so that electrode tabs 12 and 22 may be stably coupled to electrode lead 40 and 50. The contact area between the plurality of electrode tabs 12 and 22 and electrode leads 40 and 50 increases so that the large capacity of current easily moves.

Figure 8:
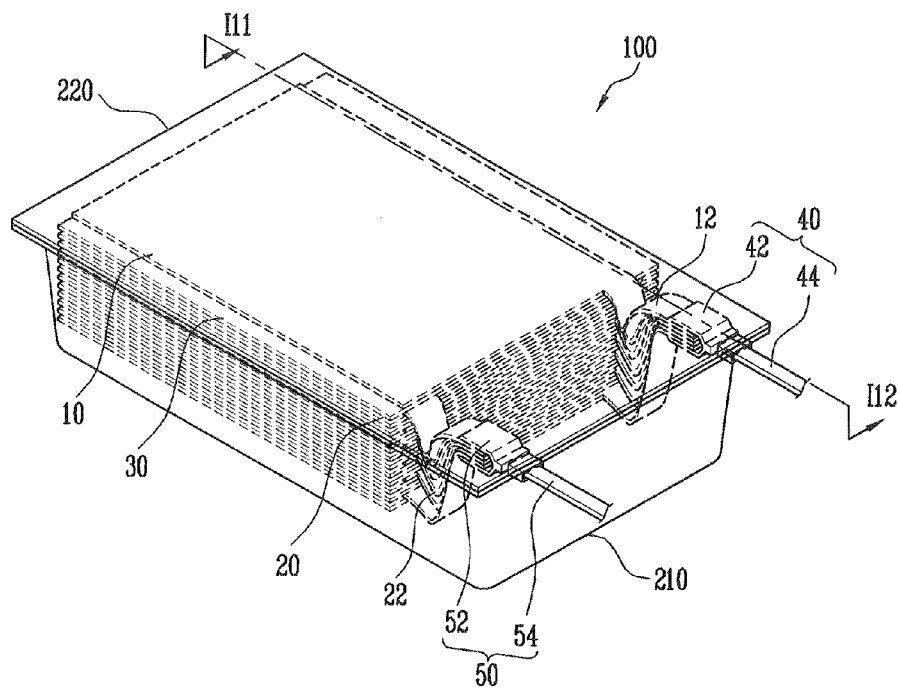
FIG. 8 is an oblique view illustrating in phanton a bare cell incorporated into a secondary battery constructed as an embodiment according to the present invention.
Figure 9:
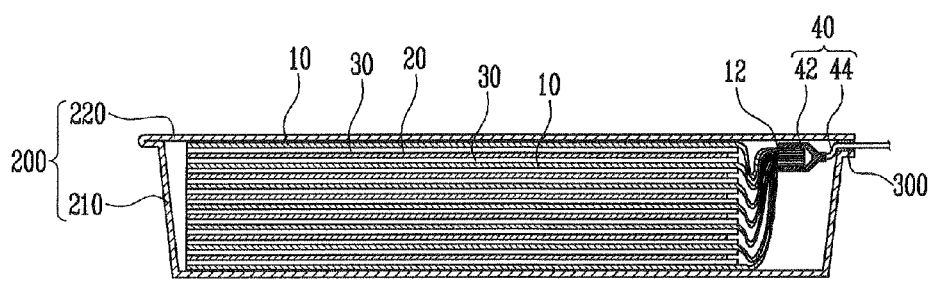
FIG. 9 is a cross-sectional view of the secondary battery taken along sectional line I11 I12 of FIG. 8.

FIG. 8 is an oblique view illustrating a secondary battery constructed as an embodiment according to the principles of the present invention. FIG. 9 is a cross-sectional view taken along the line I11-I12 of FIG. 8.

Referring to FIGS. 8 and 9, the secondary battery constructed as an embodiment according to the principles of the present invention includes an electrode assembly 100 and a case 200 described with reference to FIGS. 1 and 2.

Case 200 includes a main body 210 accommodating electrode assembly 100 therein and a cover 220 that contacts main body 210 in order to seal up electrode assembly 100 in the state where parts of lead lines 44 and 54 are exposed to the outside. Case 200 has a lamination structure in which both surfaces of a metal thin film are coated with insulating resin.

Insulating tapes 300 for sealing up and insulation are attached to lead lines 44 and 54 between main body 210 and cover 220.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. An electrode assembly, comprising:
    a plurality of alternately disposed positive electrode plates and negative electrode plates;
    separators disposed between the positive electrode plates and the negative electrode plates;
    a plurality of positive electrode tabs respectively extending from the plurality of positive electrode plates;
    a plurality of negative electrode tabs respectively extending from the plurality of negative electrode plates;
    a positive electrode lead including a clip accommodating the plurality of positive electrode tabs and a lead line electrically coupled to the clip; and
    a negative electrode lead including a clip accommodating the plurality of negative electrode tabs and a lead line electrically coupled to the clip,
    each clip comprising two legs, each leg in direct physical contact with at least one of the positive and negative electrode tabs, each leg comprising a plurality of protrusions protruding from an inner surface of the leg,
    wherein each of the plurality of protrusions has a triangular shape, the protrusions protruding from the inner surface of each leg are asymmetrically oriented, and the asymmetrically oriented triangular protrusions are unidirectionally inclined toward a direction along which the positive electrode tabs and the negative electrode tabs are inserted into the respective clip, and
    wherein the plurality of positive electrode tabs are welded to each other, and the plurality of negative electrode tabs are welded to each other.

2. The electrode assembly as claimed in claim 1, wherein each one of the positive electrode plates and the negative electrode plates is coated with an active material.

3. The electrode assembly as claimed in claim 1, further comprising holes formed in the plurality of positive electrode tabs and negative electrode tabs.

4. The electrode assembly as claimed in claim 3, wherein the holes have one of a cylindrical shape and an elliptical shape.

5. The electrode assembly as claimed in claim 3, further comprising pins formed in the clips and inserted into the holes.

6. The electrode assembly as claimed in claim 5, wherein the pins are formed on a first side of the clips and protrude toward a second and opposite side of the clips, and vertical ends of the pins formed on the first side of the clips are separated from the opposite side of the clips.

7. The electrode assembly as claimed in claim 6, further comprising grooves formed on the second side of the clips and respectively accommodating the pins.

8. The electrode assembly as claimed in claim 5, wherein the pins are formed on both sides of the clips.

9. The electrode assembly as claimed in claim 8, wherein vertical ends of first pins that are formed on a first side of the clips are separated from vertical ends of second pins that are formed on a second side of the clips.

10. The electrode assembly as claimed in claim 3, wherein the plurality of positive electrode tabs and negative electrode tabs are made of Fe, and the surfaces of the positive electrode tabs and negative electrode tabs are plated with Ni.

11. The electrode assembly as claimed in claim 1, wherein the protrusions formed on one leg of the each clip is formed to cross the protrusions formed on the other leg of the each clip.

12. The electrode assembly as claimed in claim 1, wherein the plurality of positive electrode tabs and negative electrode tabs are made of Al.

13. The electrode assembly as claimed in claim 1, wherein the clips are made of Fe.

14. The electrode assembly as claimed in claim 13, wherein surfaces of the clips are plated with Ni.

15. A secondary battery, comprising:
an electrode assembly comprising:
a plurality of alternately disposed positive electrode plates and negative electrode plates;
separators disposed between the positive electrode plates and the negative electrode plates;
a plurality of positive electrode tabs formed in the plurality of positive electrode plates;
a plurality of negative electrode tabs formed in the plurality of negative electrode plates;
a positive electrode lead including a clip accommodating the plurality of positive electrode tabs and a lead line electrically coupled to the clip;
a negative electrode lead including a clip accommodating the plurality of negative electrode tabs and a lead line electrically coupled to the clip,
each clip comprising two legs, each leg in direct physical contact with at least one of the positive and negative electrode tabs, each leg comprising a plurality of protrusions protruding from an inner surface of the leg; and
a case comprising:
a main body accommodating the electrode assembly therein; and
a cover that contacts the main body and seals up the electrode assembly in a state where parts of the lead lines are exposed to the outside of the case,
wherein each of the plurality of protrusions has a triangular shape, the protrusions protruding from the inner surface of each leg are asymmetrically oriented, and the asymmetrically oriented triangular protrusions are unidirectionally inclined toward a direction along which the positive electrode tabs and the negative electrode tabs are inserted into the respective clip, and
wherein the plurality of positive electrode tabs are welded to each other, and the plurality of negative electrode tabs are welded to each other.

16. The secondary battery as claimed in claim 15, wherein insulating tapes are attached to the lead line between the main body and the cover.

17. The electrode assembly as claimed in claim 1, wherein the clips are disposed to respectively cross the plurality of positive electrode tabs and the negative electrode tables.

* * * * *